July 12, 1966 R. L. MORA 3,260,414
TRAILER FOR CONCRETE INGREDIENTS AND THE LIKE
Filed June 17, 1964 8 Sheets-Sheet 1

INVENTOR
RAUL L. MORA
BY Browne, Schuyler & Beveridge
ATTORNEYS

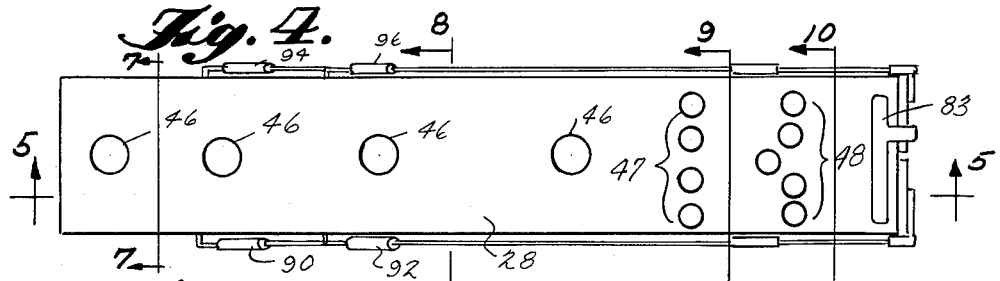
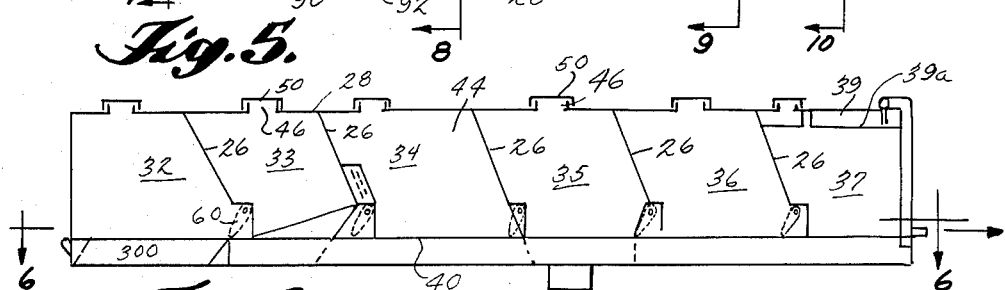
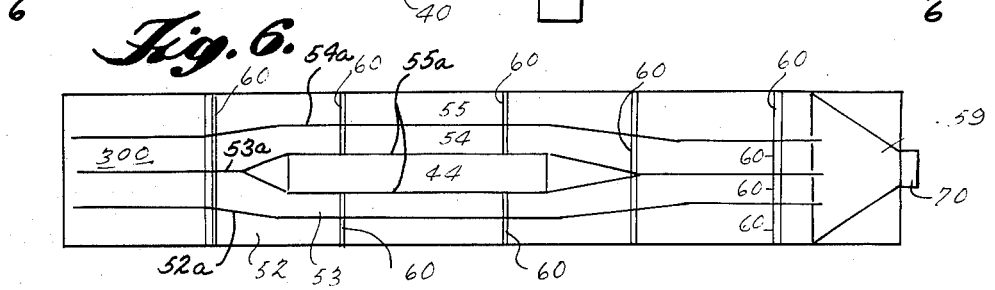
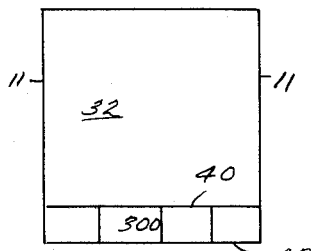
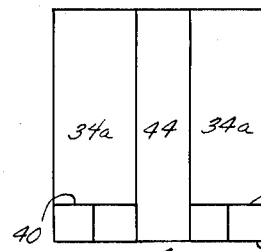
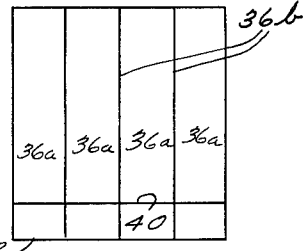
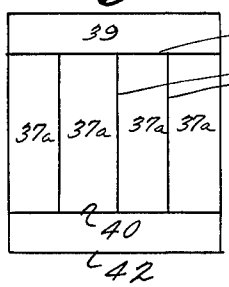

July 12, 1966  R. L. MORA  3,260,414
TRAILER FOR CONCRETE INGREDIENTS AND THE LIKE
Filed June 17, 1964  8 Sheets-Sheet 3
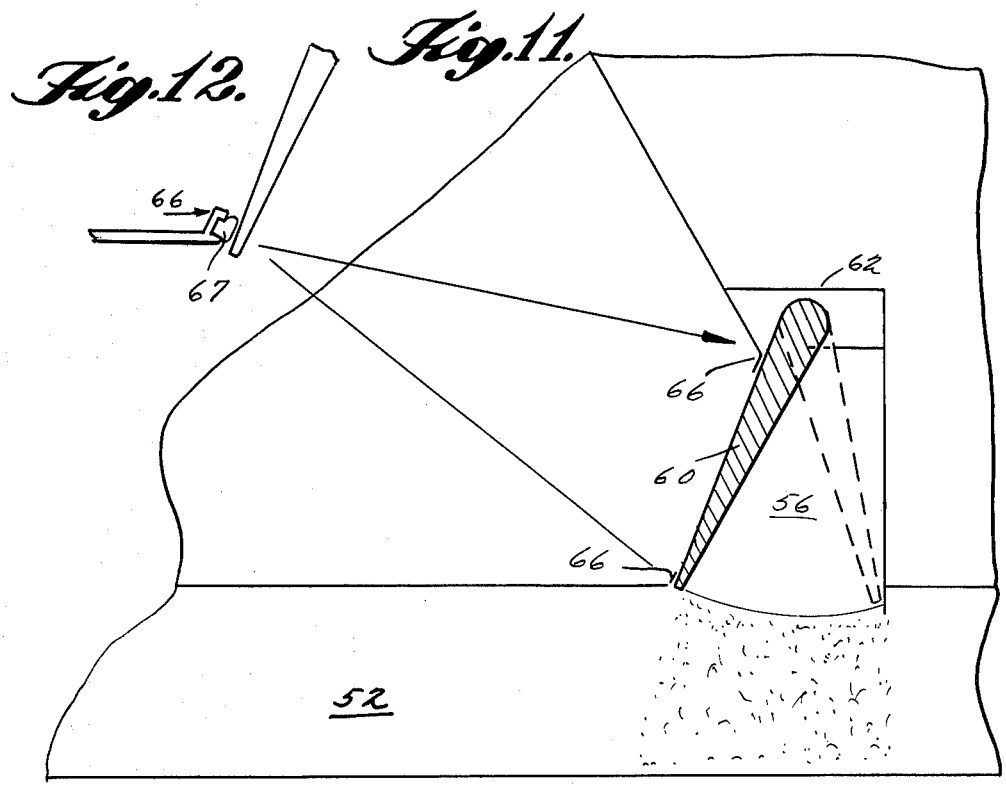
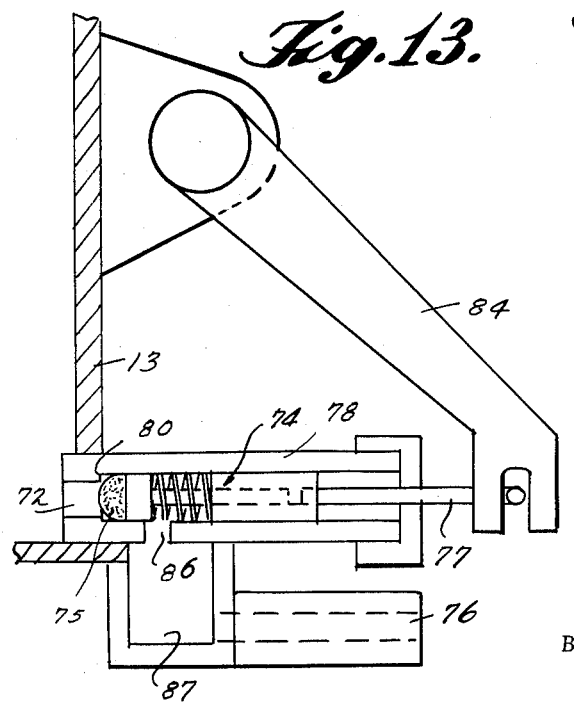
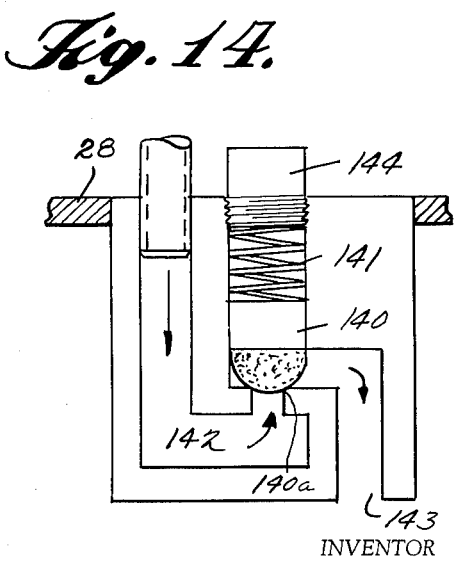
INVENTOR
RAUL L. MORA
BY Browne, Schuyler & Beveridge
ATTORNEYS July 12, 1966  R. L. MORA  3,260,414
TRAILER FOR CONCRETE INGREDIENTS AND THE LIKE
Filed June 17, 1964  8 Sheets-Sheet 4
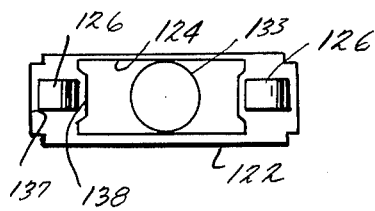
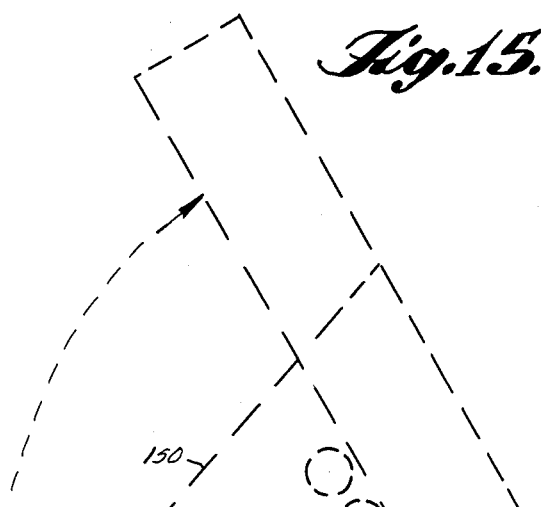
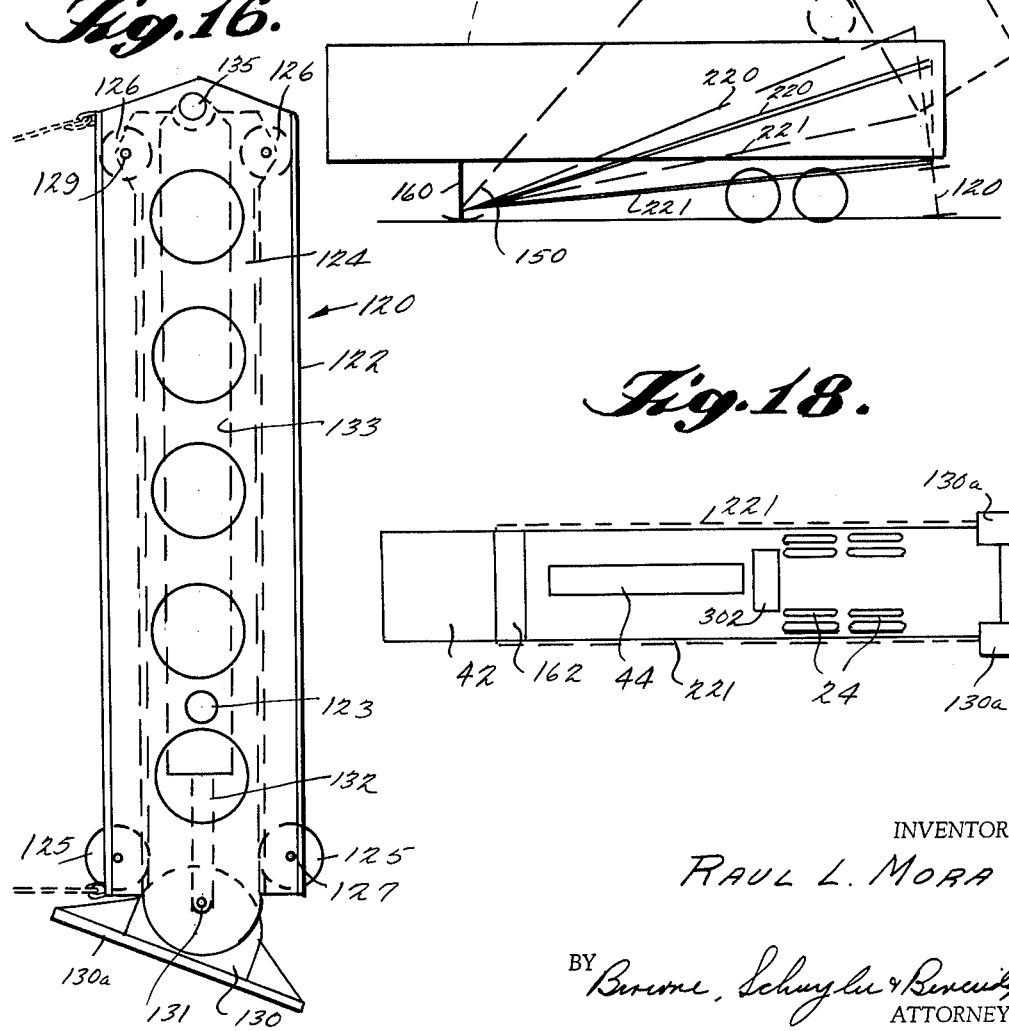
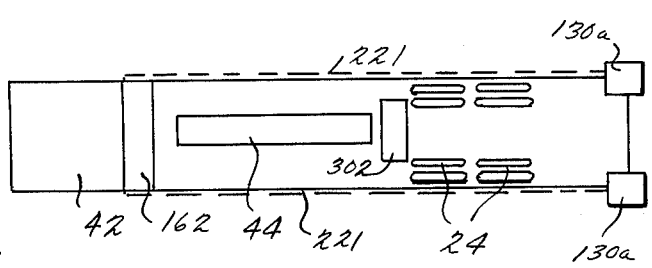
INVENTOR
RAUL L. MORA
BY
ATTORNEYS

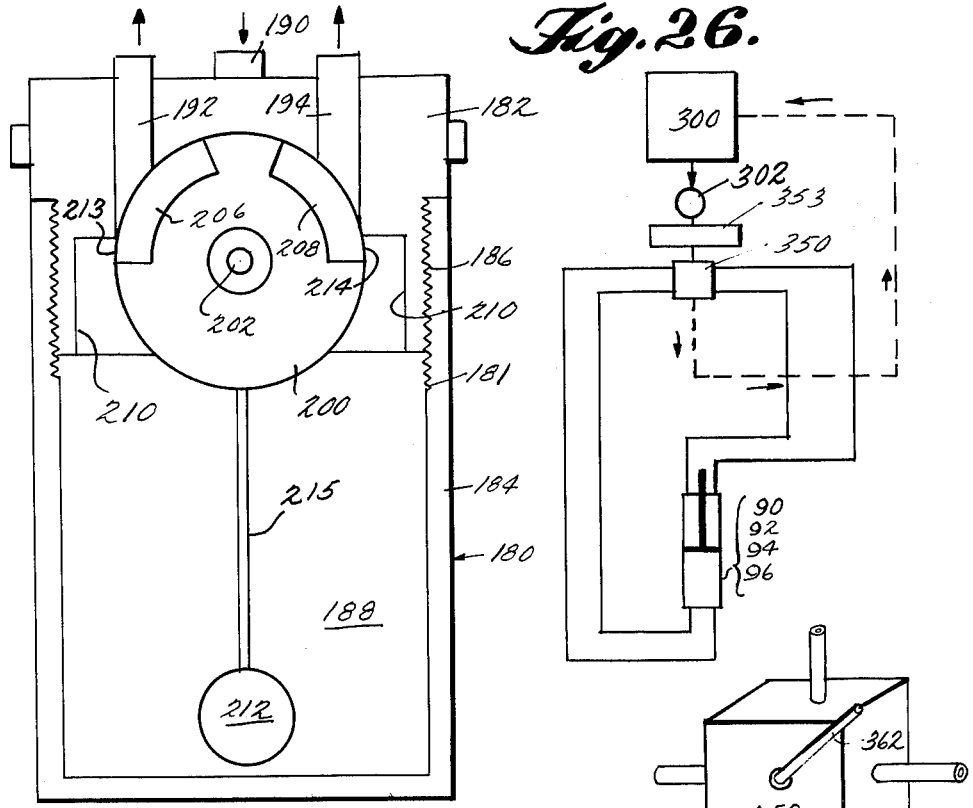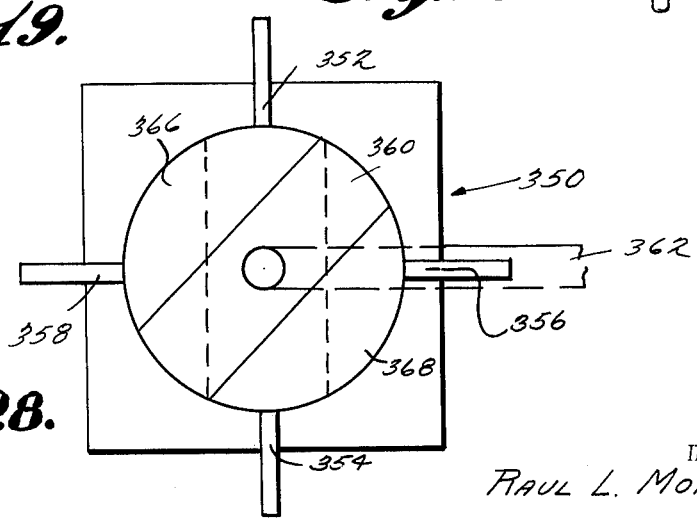

July 12, 1966 R. L. MORA 3,260,414
TRAILER FOR CONCRETE INGREDIENTS AND THE LIKE
Filed June 17, 1964 8 Sheets-Sheet 6
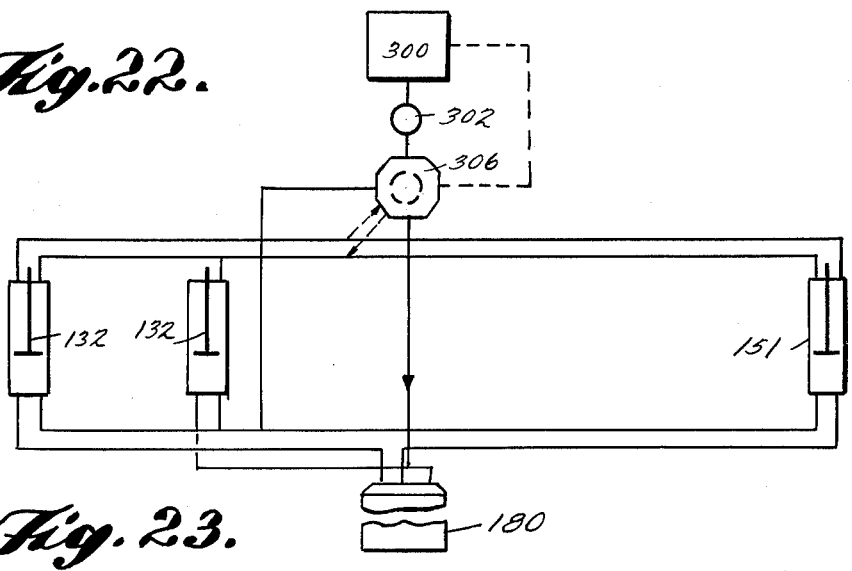
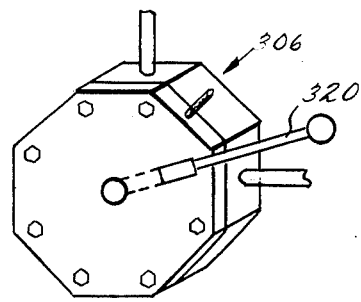
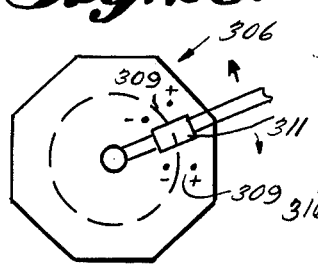
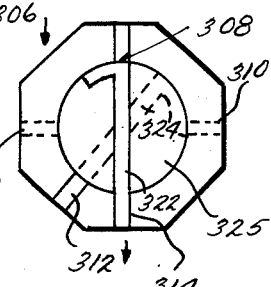
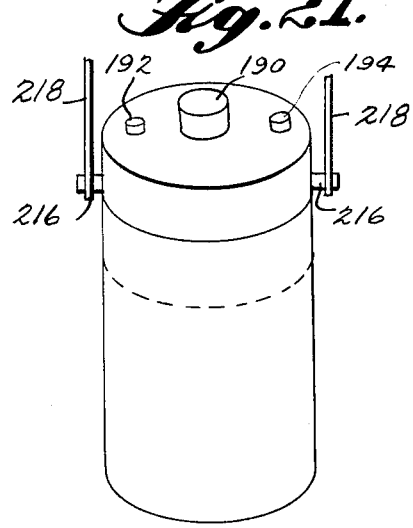
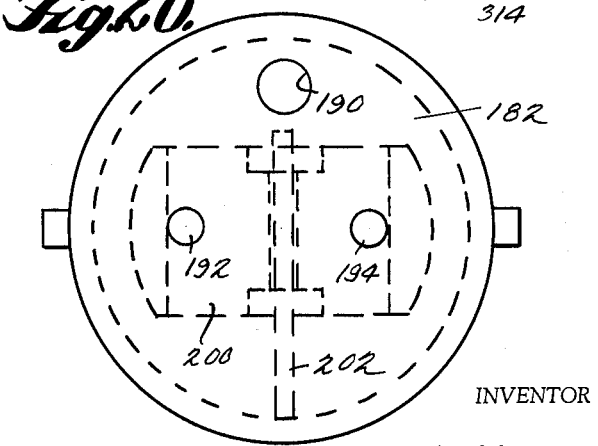
INVENTOR
RAUL L. MORA
BY Browne, Schuyler & Beveridge
ATTORNEYS

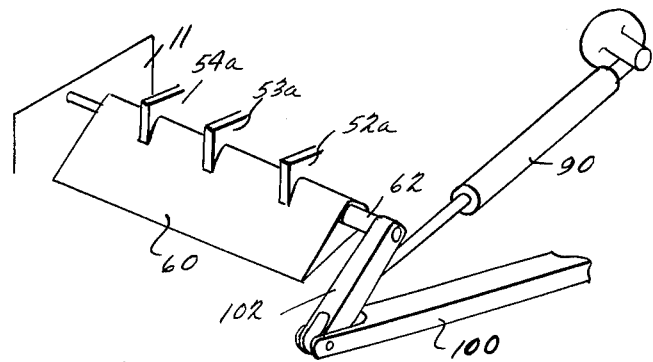
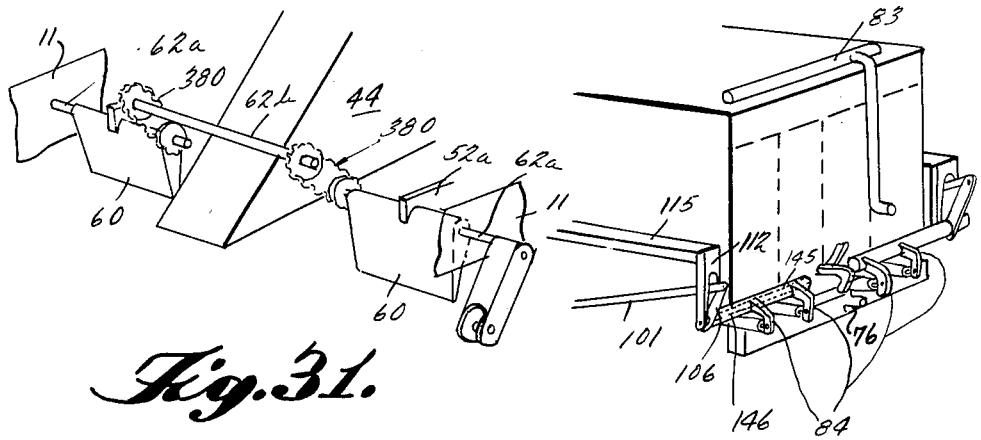
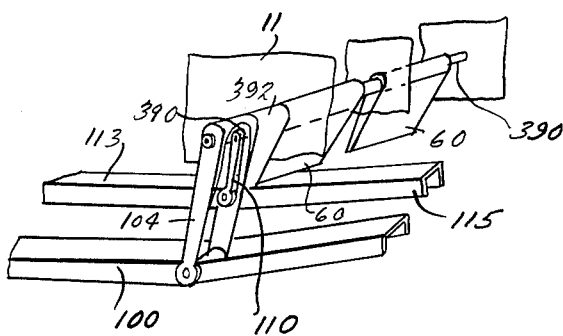

July 12, 1966  R. L. MORA  3,260,414
TRAILER FOR CONCRETE INGREDIENTS AND THE LIKE
Filed June 17, 1964  8 Sheets-Sheet 8

INVENTOR
RAUL L. MORA

BY Browne, Schuyler & Beveridge
ATTORNEYS

United States Patent Office 3,260,414
Patented July 12, 1966

3,260,414
TRAILER FOR CONCRETE INGREDIENTS
AND THE LIKE
Raul L. Mora, 3230 SW. 23rd Court,
Fort Lauderdale, Fla.
Filed June 17, 1964, Ser. No. 375,762
34 Claims. (Cl. 222—145)

This invention generally relates to storing and handling concrete ingredients or the like before they are mixed to form a batch of concrete and more specifically to a novel trailer for storing, transporting and discharging such ingredients.

Well recognized today are the limitations of conventional concrete mixing trucks from the standpoints of payload, highway weight laws, operation and labor, and the critical time element in which the payload must be unloaded. These limitations, of course, bear directly on cost and in instances such as where the job site is quite remote from the batching plant, the use of conventional concrete mixing trucks can result in an inordinately high ratio of concrete cost to overall construction cost.

It is therefore one of the principal objects of the present invention to provide a novel trailer that will store and discharge concrete ingredients or the like in a highly improved manner which will substantially reduce the cost of producing concrete.

A further object of the present invention is to provide such a novel and improved trailer that may be utilized in conjunction with conventional loading apparatus employed at concrete batching plants as well as conventional concrete mixing apparatus employed at construction sites.

A still further object of the present invention is to provide such a trailer that is capable of providing ingredients for one or more batches of concrete as pre-selected and yet is unloaded through means of gravity.

Another object of the present invention is to provide such a trailer incorporating a novel mechanism for raising the trailer into an inclined position for unloading its ingredients and a novel leveling device for maintaining the trailer level from side to side while it is being raised for unloading.

Another object of the present invention is to provide such a trailer having a novel valve and duct system for controlling the discharge of its stored ingredients.

A still further object of the present invention is to provide such a trailer incorporating a novel power system for actuating its unloading mechanism including its discharge valves, which power system may be conveniently controlled by a single operator.

Still another object of the present invention to provide a novel and improved trailer in which concrete ingredients may be easily and efficiently loaded and thereafter are maintained in separate air-tight compartments.

Still another object of the present invention is to provide a trailer which will obtain the above objects and yet has a rugged construction and may be hitched to conventional tractors for transportation.

Other objects and the entire scope of the present invention will become apparent from the following detailed description and by reference to the accompanying drawings. It should be understood, however, that the detailed description and specific examples, while indicating preferred embodiments of the invention, are given by way of illustration only, since various changes and modifications within the spirit and scope of the invention will become apparent as the description herein progresses.

In the drawings:

FIG. 4 is a top plan view of the trailer shown in FIG. 3;

FIG. 5 is a cross-sectional view taken generally along lines 5—5 of FIG. 4 with parts of the trailer removed;

FIG. 6 is a cross-sectional view taken generally along lines 6—6 of FIG. 5;

FIG. 7 is a cross-sectional view taken generally along lines 7—7 of FIG. 4 with parts of the trailer removed;

FIG. 8 is a cross-sectional view taken generally along lines 8—8 of FIG. 4 with parts of the trailer removed;

FIG. 9 is a cross-sectional view taken generally along lines 9—9 of FIG. 4 with part of the trailer removed;

FIG. 10 is a cross-sectional view taken generally along lines 10—10 of FIG. 4 with parts of the trailer removed;

FIG. 11 is an enlarged longitudinal cross-sectional view of the trailer in fragment showing one of the valves which control the discharge of dry aggregate from the trailer;

FIG. 12 is a detail view illustrating the seat of the valve shown in FIG. 11;

FIG. 13 is an enlarged longitudinal cross-sectional view taken at the rear of the trailer showing one of the valves which controls the discharge of liquid ingredient from the trailer;

FIG. 14 is an enlarged fragmentary cross-sectional view taken through the top wall at the rear end of the trailer showing a valve which controls the emission of compressed air into the trailer;

FIG. 15 is a side view of the trailer in schematic showing the normal position of the trailer in full lines and an unloading position of the trailer in phantom lines;

FIG. 16 is a side elevational view of a rear support leg of the trailer in raised or normal position;

FIG. 17 is a plan view of the support leg of FIG. 16;

FIG. 18 is a bottom view of the trailer in schematic;

FIG. 19 is a longitudinal cross-sectional view of a leveling device incorporated in the trailer;

FIG. 20 is a plan view of the leveling device of FIG. 19;

FIG. 21 is a perspective view to reduced scale of the leveling device of FIG. 19;

FIG. 22 is a schematic view of a hydraulic system employed in raising and lowering the trailer between the normal and unloading positions illustrated in FIG. 15;

FIG. 23 is a perspective view of a master control valve included in the system of FIG. 22;

FIG. 24 is a transverse cross-sectional view of the valve of FIG. 23 showing the ports and passages thereof;

FIG. 25 is a front view of the valve of FIG. 23 with a portion removed to show an electric switch conrolled by the actuator of the valve;

FIG. 26 is a schematic view of a hydraulic system employed to operate the discharge valves of FIGS. 11 and 13;

FIG. 27 is a perspective view of a control valve included in the system of FIG. 26;

FIG. 28 is a transverse cross-sectional view of the valve of FIG. 27 showing the ports and passages thereof;

FIG. 29 is a fragmental perspective view of the discharge valve of FIG. 11 and its associated operating mechanism;

FIG. 30 is a fragmental perspective view of a pair of discharge valves for dry aggregate and their associated operating mechanism;

FIG. 31 is a fragmental perspective view of another pair of discharge valves for dry aggregate together with their associated operating mechanism;

FIG. 32 is a fragmental perspective view of the rear end of the trailer with certain portions removed, illustrating operating mechanism of the liquid valves of FIG. 13;

Figure 1:
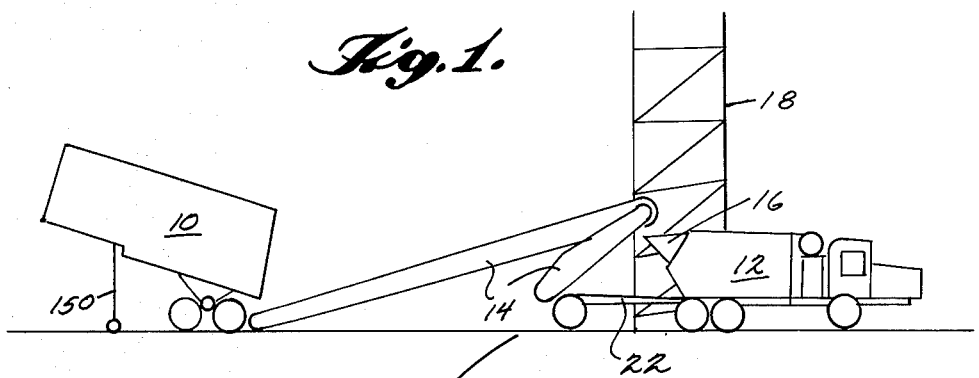
FIG. 1 is a schematic view illustrating the trailer of the present invention as employed at a construction site together with related concrete mixing and conveying apparatus.
Figure 2:
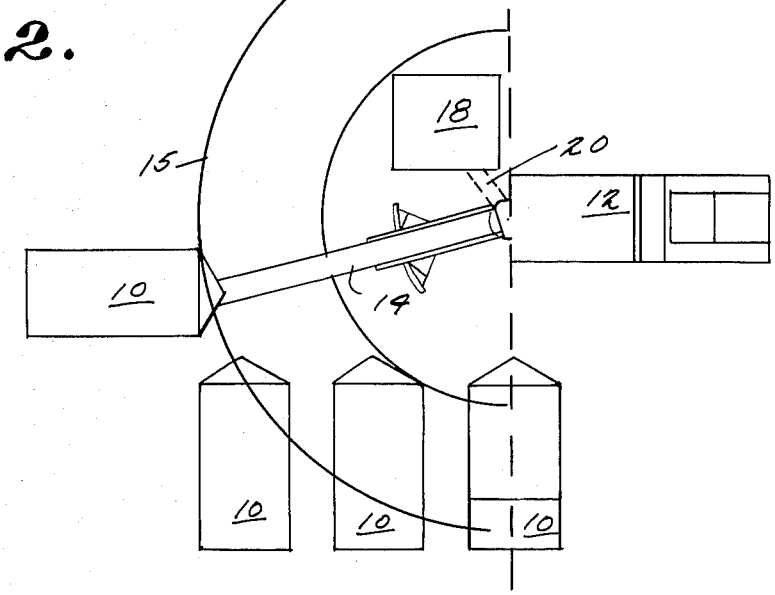
FIG. 2 is a schematic view in plan illustrating an unloading operation in conjunction with several trailers of the present invention.

Referring to the drawings in detail, FIGS. 1 and 2 illustrate a trailer generally designated 10, embodying the present invention, as would be employed at a construction site together with a concrete mixing truck 12 into which the concrete ingredients are discharged by a suitable conveying apparatus 14 which extends between the discharge outlets of trailer 10 and hopper 16 of mixing truck 12. Also shown is a typical elevator tower 18 onto which the mixed concrete is deposited from mixing truck 12 by means of a chute 20. Conveying apparatus 14 is mounted on a trailer 22 which in turn is pivotally connected to the mixing truck 12 whereby the conveying apparatus 14 may be moved along an arc into successive registration with several trailers 10 arranged along the arc as illustrated in FIG. 2.

*Trailer body*

Trailer 10 of the present invention is of the highway type including a generally box-like body that may be hitched to a conventional tractor (not shown) so as to be transported for example between a batching plant where the trailer is loaded with concrete ingredients and a construction site where the trailer is unloaded into mixing apparatus as generally described above. Any suitable chassis, not shown, may be provided to support the trailer in conjunction with the illustrated tandem wheels 24.

Referring to FIG. 5, the body of trailer 10 is divided into a plurality of longitudinally spaced major compartments 32, 33, 34, 35, 36 and 37 by means of partitions 26 which extend from the top wall 28 of the trailer downwardly at an angle of about 30° towards the rear of the trailer. Partitions 26 extend transversely to side walls 11 of the trailer and terminate at their lower ends on a horizontal partition 40 extending throughout the trailer in spaced parallel relationship to the base 42 of the trailer. Compartments 32, 33, 34, 35, 36 and 37 are for storing concrete ingredients such as coarse aggregate, fine aggregate and water. In the preferred embodiment the four compartments 32, 33, 34 and 35 are employed for storing coarse aggregate such as sand and stone, the intermediate compartment 36, fine aggregate such as cement, and the rear compartment 37, liquid such as water. Referring to FIGS. 9 and 10, compartments 36 and 37 for fine aggregate and liquid are each sub-divided into four sub-compartments 36a and 37a by transversely spaced partitions 36b and 37b. In this manner four batches of concrete of different ingredient proportions may be provided by the trailer. If desired, a spare liquid compartment 39 may be provided above liquid sub-compartments 37a by means of a horizontal partition 39a.

Referring to FIGS. 5 and 8, coarse aggregate compartment 34 is divided into two aggregate receiving sub-compartments 34a spaced by a sub-compartment 44 which is employed to house a supporting leg 150 of the trailer which will be subsequently described in greater detail. Sub-compartment 44 is extended to the base 42 of the trailer by cutting out an appropriate portion of horizontal partition 40.

Figure 3:
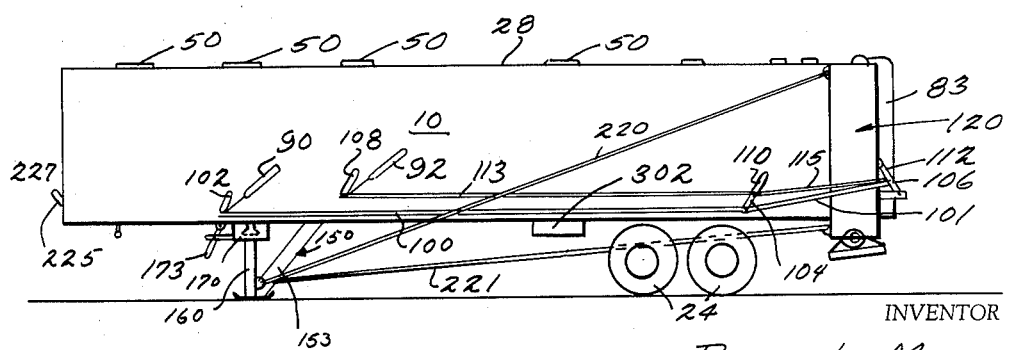
FIG. 3 is a side elevational view in schematic of a trailer embodying the present invention.
Figure 33:
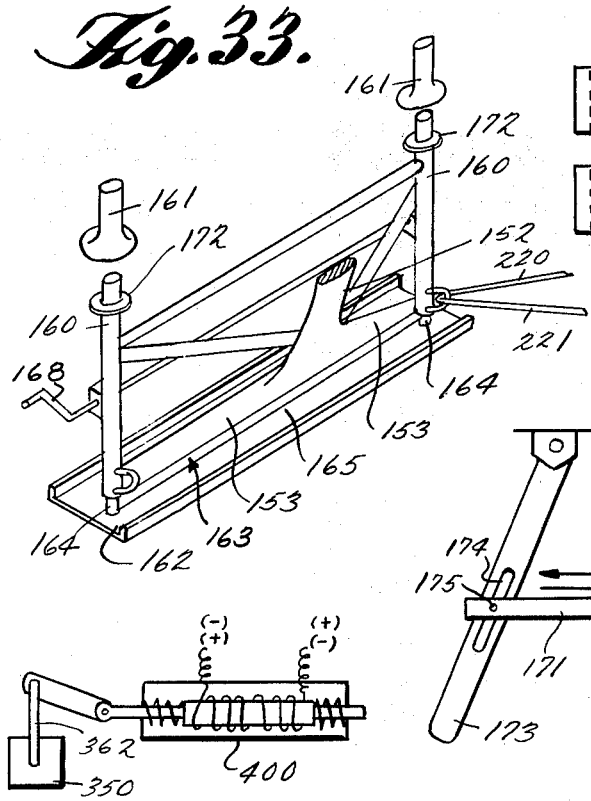
FIG. 33 is a fragmental perspective view of a support structure employed below the trailer generally at the front end thereof.

Loading of the various ingredients into the compartments of the trailer is provided by a plurality of inlets 46, 47 and 48 located in the top wall 28 of the trailer so as to communicate with the compartments and sub-compartments respectively (see FIG. 4). As shown in FIG. 3, each loading inlet 46, 47 and 48 has a removable lid 50 and the construction of the lids 50 as well as that of the trailer body is such as to provide insulated as well as airtight sealing of the ingredients stored in the compartments. In this manner the moisture content of the aggregate will be maintained at a pre-determined constant value to meet concrete inspection requirements.

Referring to FIGS. 5 and 6, a plurality of longitudinally extending ducts 52, 53, 54 and 55 are provided in the base of the trailer below horizontal partition 40 for conveying the aggregates from their respective compartments to a discharge spout 70 located in the lower rear end of the trailer. Ducts 52, 53, 54 and 55 are formed by upstanding partition strips 52a, 53a, 54a and 55a extending longitudinally along the trailer base and terminating at the rear of the trailer into a compartment 59 which converges into discharge spout 70 as shown in FIG. 6.

*Discharge valves—aggregate*

Discharge of the aggregates from their respective compartments into the ducts 52, 53, 54 and 55 is through means of outlet passages 56 extending between the lower right-hand end of the compartments and the ducts as best shown in FIGS. 5 and 11. Outlet passages 56 are controlled by flap valves 60 mounted on horizontal shafts, generally designated 62, for pivotal movement between a first position closing the associated outlet passage 56 and a second position opening the outlet passage as shown in FIG. 11.

The number and arrangement of flap valves 60 is illustrated in FIGS. 5 and 6 and includes one valve 60 controlling the discharge of the front compartment 32; two valves 60 arranged on opposite sides of sub-compartment 44 for controlling the discharge from compartment 33; two valves 60 arranged on opposite sides of sub-compartment 44 controlling discharge from subcompartment 34a; one valve 60 controlling discharge from compartment 35; and four valves 60 controlling discharge from sub-compartments 36a.

Referring to FIG. 29, the valves 60 associated with compartments 32 and 35 respectively are supported on shafts 62 which are journalled for rotation in side walls 11 of the trailer and are additionally supported by the duct forming partition strips 52a, 53a, 54a and 55a. Referring to FIG. 30, the valves 60 associated with compartment 33 are supported on separate shafts 62a which are journalled for rotation in trailer sidewalls 11 and operatively inter-connected by an auxiliary shaft 62b and associated pulley mechanism generally designed 380. The two valves 60 associated with compartments 34a are arranged on opposite sides of compartment 44 similar to the valves 60 associated with compartments 33, however, valves 60 of sub-compartments 34a are mounted for rotation on the same shaft 62 which extends fully across the trailer. Valves 60 described thus far in connection with compartments 32, 33, 34a and 35 are suitably keyed to their respective shafts 62, 62a for actuation as will be subsequently described in greater detail.

Referring to FIG. 31, the four valves 60 associated with sub-compartments 36a are mounted for actuation on two pairs of telescoping shafts 390, 392 (only one pair shown in FIG. 31); inner shaft 390 suitably keyed to one of the inwardly located valves 60 while outer hollow shaft 392 receives inner shaft 390 and is suitably keyed to one of the outwardly located valves 60.

While in the closed position, flap valves 60 each engage a pair of seats 66 extending transversely on opposite sides of outlet passages 56 at the juncture between outlet passages 56 and the aggregate compartments. Valve seats 66 are preferably provided with a resilient insert 67 as shown in FIG. 12 so as to produce an effective seal. This seal extends entirely around each opening for outlet passages 56.

Discharge valves—liquid

Discharge of the liquid ingredient from sub-compartments 37a is effected through outlets 72 in the lower portion of the rear end wall 13 of the trailer; there being four outlets 72 corresponding to the four liquid sub-compartments 37a. Referring to FIG. 13, four reciprocating valves 74 are provided for respectively controlling the discharge of liquid from sub-compartments 37a to a discharge spout 76. In the illustrated embodiment each of the valves 74 is slidably received in a tubular casing 78 secured to the trailer end wall 13 in the associated liquid outlet 72. Casing 78 has a seat 80 surrounding outlet 72 and co-operable with the head 75 of valve 74 to close outlet port 72 in one position of valve 74. Communication between each liquid outlet 72 and discharge spout 76 when the associated valve member 74 is open, is through port 86 formed in valve casing 78 and an outlet manifold 87 communicating with port 86 and discharge spout 76.

Referring to FIGS. 13 and 32 reciprocation of valves 74 into and out of engagement with their respective seats 80 is obtained by means of crank arms 84 connected to the stems 77 of valves 74 respectively. Actuation of crank arms 84 to operate valves 74 is provided by two pairs of telescoping shafts including an inner shaft 145 driveably connected to one of crank arms 84 and an outer hollow tubular shaft 146 receiving inner shaft 145 and driveably connected to another crank arm 84 associated with another valve 74.

In order to force liquid out of compartments 37a when the associated discharge valves 74 are open, the trailer is provided with a manifold 83 (see FIGS. 3 and 14) for conveying compressed air from a suitable source into the top of sub-compartments 37a. Referring to FIG. 14, admission of compressed air from manifold 83 to sub-compartments 37a is effected by a check valve generally designated 140 suitably mounted in the top wall 28 of the trailer above each sub-compartment 37a. Each check valve 140 is biased by a spring 141 to a position closing communication between an inlet passage 142 connected to manifold 83 and an outlet passage 143 communicating with the associated sub-compartment 37a. Sufficient air pressure will raise check valve 140 from its seat 140a to admit compressed air into sub-compartment 37a for accelerating the discharge of liquid through outlet spout 76. The biasing force of spring 141 may be varied by means of an adjustable plug 144 threaded into top wall 17 of the trailer in engagement with spring 141 as shown in FIG. 14.

Actuation of discharge valves—hydraulic rams and linkage

Actuation of the aggregate and liquid discharge valves 60 and 74 between their open and closed positions is achieved by hydraulic rams 90, 92, 94, 96; rams 90 and 92 being located on one side of the trailer and rams 94 and 96 on the other side as illustrated in FIG. 4. Each ram, through associated levers and linkage, controls the actuation of two flap valves 60 associated with coarse and fine aggregate compartments respectively and one liquid valve 74 associated with one of liquid sub-compartments 37a. Referring to FIGS. 3 and 29, ram 90 operates lever 102 which in turn is operatively connected to shaft 62 of flap valve 60 associated with coarse aggregate compartment 32. Rods 100 and 101 connect lever 102 to levers 104 and 106 which are operatively connected respectively to a flap valve 60 of a fine aggregate sub-compartment 36a and a liquid valve 74 associated with one of the liquid sub-compartments 37a. In this latter linkage, lever 104 is connected to tubular shaft 392 (see FIG. 31) which drives one of the outwardly located flap valves 60 while lever 106 is connected to tubular shaft 146 which drives the crank arm 84 of one of the outer liquid valves 74 (see FIG. 32). In the same manner ram 92 operates levers 108, 110 and 112 associated with one flap valve 60 for coarse aggregate, one flap valve 60 for fine aggregate and one liquid valve 74; levers 108, 110, 112 being interconnected by rods 113 and 115 with lever 110 being operatively connected to inner shaft 390 (see FIG. 31) which drives one of the inwardly located valves 60 for fine aggregate and lever 112 being operatively connected to inner shaft 145 which drives the crank arm 84 of one of the inwardly located liquid valves 74. Rams 94, 96 on the opposite side of the trailer similarly control the actuation of the remaining flap valves 60 and liquid discharge valves 74.

Unloading mechanism

Unloading of the ingredients from their respective compartments to the discharge outlets 70, 76 at the rear of the trailer is accomplished by raising the trailer to the inclined position shown in phantom in FIG. 15 so that the ingredients will flow by gravity. For this purpose the trailer is provided with a novel hydraulic mechanism which basically includes: a pair of extendible and retractable support legs generally designated 120 mounted to the opposite sides 11 at the rear end of the trailer; and the support leg 150 which projects downwardly from sub-compartment 44 at an incline of approximately 60° and which is also extendible and retractable.

Rear support legs

Referring to FIGS. 16 and 17, rear support legs 120 in the illustrated embodiment each comprise an elongate outer box-like shell or casing 122 pivotally connected to the trailer side walls 11 by a shaft 123 located towards the base of the trailer. Slideably telescoped in outer casing 122 is an inner casing 124 of a similar elongate box-like construction. Between inner and outer casings 122, 124 at their opposite ends there are provided roller bearings 125, 126; bearings 125 being rotatably mounted on shafts 127 fixed to outer casing 122 while bearings 126 being rotatably mounted on shafts 129 fixed to inner casing 124. As best shown in FIG. 17, tracks 137 and 138 are formed in the sides of casings 122, 124 so as to receive roller bearings 125 and 126 to guide the inner casing 124 in its movement between extended and retracted positions as will be subsequently described.

For engaging the surface below the trailer, a bearing shoe 130 is pivotally connected to the lower ends of each of inner casings 124 by means of a pin 131 extending generally normal to the plane of trailer sidewalls 11. Shoes 130 have rectangular bearing surfaces 130a (see FIG. 18), and are pivotable about pins 131 for adjusting to the contour of the surface below the trailer upon extension of inner casing 124 prior to unloading the trailer.

Longitudinal movement is imparted to inner casings 124 by hydraulic rams 132, each of which is connected at its lower end to an associated inner casing 124 and shoe 130 by suitable means including pin 131. Each ram 132 is slideably received in a hydraulic cylinder 133 which in turn is received in the inner casing 124 and fixed at its upper end to outer casing 122 by any suitable means such as pin 135.

Level control device

In order to insure the trailer will be maintained level from side to side as it is being raised into the unloading position, there is provided a novel level control device generally designated 180 for regulating the supply of hydraulic fluid to rams 132 of rear support legs 120 in accordance with the transverse posture of the trailer.

In the illustrated embodiment shown in FIGS. 19, 20 and 21, control device 180 includes a cylindrical casing 181 formed from upper and lower sections 182, 184 threadedly interconnected at 186. Lower casing section 184 has a chamber 188 filled with hydraulic fluid by means of inlet passage 190 provided in upper section 182 so as to be in constant communication with chamber 188. Hydraulic fluid is supplied from chamber 188 to rams 132 of rear support legs 120 by means of outlet passages 192, 194 formed in the upper casing section 182.

Flow from chamber 188 to outlet passages 192, 194 and in turn rams 132 is controlled by a rotary valve member 200 mounted for rotation in upper casing section 182 about pin 202 fixed transversely in the upper casing section. Arcuate passages 206, 208 are formed in the periphery of valve member 200 to be registrable with outlet passages 192, 194 and chamber 188. Variable communication between arcuate passages 206 and 208 and chamber 188 is provided by an enlarged annular passage 210 formed in the upper casing section 182 (see Fig. 19). Annular passage 210 thus provides a pair of metering ports 213, 214 whose areas are variable depending on the relative angular position between valve member 200 and upper casing section 182.

Biasing valve member 200 into the vertical position shown in FIG. 19 is a pendulum type weight including a lower portion 212 of pre-determined weight and a stem 215 extending from the lower portion 212 and fixed to valve member 200 so that the axis of stem 215 intersects the pivotal axis of valve member 200.

In use, level control device 180 is vertically suspended from the trailer for pivotal movement about a horizontal axis extending transversely of the trailer. In the illustrated embodiment shown in FIG. 21 this is accomplished by pivots 216 fixed in diametrically opposed relation to the upper end of control device 180. Pivots 216 project externally of control device 180 and are journalled for rotation in straps 218 suitably secured to the trailer to depend perpendicularly from the plane of the trailer base 42.

It will thus be apparent that if the trailer is level from side to side outlet passages 192, 194 of control device 180 will be parallel to the stem 215 of the pendulum weight and there will be equal registration and fluid flow between chamber 188 and each of metering ports 213, 214 and in turn each of outlet passages 192, 194 and rams 132. However, if the trailer is transversely tilted or out of level from side to side, rotary valve member 200 will remain in the vertical position under the influence of pendulum weight 212 and the control device casing 181 will be tilted with the trailer whereby the area of one of the metering ports 213, 214 will be increased while the area of the other metering port will be decreased over that existing when the trailer is level (see FIG. 19). This in turn will cause the support leg 120 that is hydraulically driven through the metering port of increased area to rise at a faster rate than the other supporting leg 120 until the trailer becomes transversely level whereupon equal registration and consequently fluid flow will be afforded to both of metering ports 213, 214 since the control device casing 181 will have returned to the level position relative to the rotary valve member 200 as shown in FIG. 19.

*Front support structure*

Referring now to FIGS. 3, 15, 18, and 33, front support leg 150 hereinafter referred to as the "tilting" leg, has an extendible portion or ram 151 that is slideably received in a cylinder 152 which is suitably pivotally connected at its upper end in sub-compartment 44 generally at the top wall 28 of the trailer. The lower end of tilting leg 152 which projects below the base 42 of the trailer, branches transversely into two sections 153 that are fixed at their extremities to the lower ends of a pair of vertical abutment posts 160. The upper ends of abutment posts 160 are receivable in sockets 161 provided in the base of the trailer.

A rectangular bearing shoe 162 is provided below abutment posts 160 and tilting leg 150 so as to be engageable with the ground below the trailer transversely thereof. Bearing shoe 162 is mounted to be extended or retracted into or out of engagement with the ground below the trailer by means of a U shape supporting frame 163 including upstanding portions 164 telescopingly received in abutment posts 160 and a cross piece 165 to which bearing shoe 162 is suitably hinged so as to be pivotable about cross piece 165 for adjustment during operation of tilting leg 150.

Figure 35:
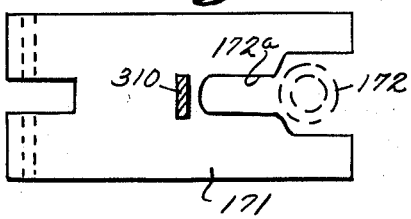
FIG. 35 is a plan view of a part of the latch shown in FIG. 34.
Figure 34:
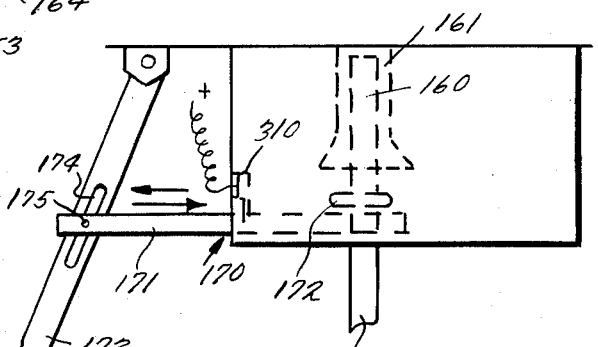
FIG. 34 is a fragmental side-elevational view of the trailer illustrating a latch associated with the support structure of FIG. 33.

As shown in FIGS. 34 and 35 a pair of latches generally designated 170 are provided for releaseably locking abutment posts 160 in their respective sockets 161 when the trailer is in the horizontal or storage position. Latches 170 each include a slideable plate 171 having a U shape slot 172a dimensioned to receive abutment post 160 so as to be engagable with a stop 172 fixed to abutment post 160 above plate 171 to thereby lock the abutment post in its socket 161. Latch plates 171 are operable between latching and unlatching positions by levers 173 pivotally connected at one end to the trailer base and having elongated slots 174 which receive a cross pin 175 mounted in latch plates 171. An on-off switch 310 is provided in association with one of the latches 170 so as to be operable thereby for a purpose to be subsequently described in greater detail.

In order to add stability to rear support legs 120 when in use, a pair of cables 220, 221 of heavy steel construction for example, are connected to the opposite ends of the outer casings 122 of each support leg 120 and to abutment ports 160 as shown in FIGS. 3 and 15. In connecting the ends of cables 220, 221 to abutment posts 160 and support legs 120, the ends of the cables are tied or fixed in any suitable manner so that when the trailer is tilted into the unloading position the length of cables 220, 221 will remain constant while the support leg 120 pivots as will be subsequently described in greater detail. Cables 220, 221 may also be employed to carry hydraulic lines which supply and exhaust ram 151.

*Hydraulic system—support legs*

The hydraulic system for operating rear support legs 120, tilting leg 150 and aggregate and liquid discharge valves 60 and 74 includes a fluid reservoir 300 located in the base of the trailer at the front end thereof and a suitable electrically driven pump 302, shown in FIG. 3 as housed below the base of the trailer, for pumping hydraulic fluid from the reservoir 300 to the various supply lines. An inlet 225 and closure cap 227, through which the reservoir may be filled with hydraulic fluid, is located at the front end of the trailer as shown in FIG. 3.

Referring to FIGS. 22 and 24 the supplying and exhausting of rams 132 and 151 associated with rear support legs 120 and tilting leg 150 respectively are controlled by a master valve generally designated 306 including: an inlet port 308 connected to the outlet of pump 302; return port 310 connected to reservoir 300 for returning hydraulic fluid thereto; work ports 312 and 314 for supplying the rams of support legs 120, 150, work port 312 also serving as an exhaust port; and port 316 providing another exhaust port. Communication between inlet port 308 and work ports 312, 314 and between exhaust ports 312, 316 and return port 310 is provided by supply and exhaust passages 322 and 324 respectively radially formed in a typical rotary plug 325 which is operable into three control positions by a lever 320 connected thereto.

In one position of valve plug 325, all of the valve ports are closed and there is flow stoppage in the system and support legs 120 and 150 are thereby locked in position. In the second position, employed for tilting the trailer for unloading, hydraulic fluid flows from inlet port 308, through supply passage 322, out work port 314 and then to leveling device 180 and one end of ram 151 of tilting leg 150. In this position of master valve plug 325, fluid flows to rams 132 of rear legs 120 under regulation by leveling device 180 described above. At the same time fluid is being supplied to one of the ends of rams 132, 151, fluid is exhausting from the other ends thereof through port 312 passage 324 and return port 310.

In the third position of master valve 306, employed for lowering the trailer to its normal horizontal position, hydraulic fluid flows from inlet port 308 to the opposite ends of rams 132, 151 by means of passage 322 and work port 312 while fluid is exhausted from the initially supplied ends of rams 132, 151 by means of exhaust port 316, exhaust passage 324 and return port 310. In this position of master valve 306, it will be noted (see FIG. 22) that the rams 132 of rear support legs 120 are supplied directly without the use of leveling device 180.

Hydraulic system—discharge valves

Referring to FIGS. 26, 27 and 28 there is illustrated that portion of the hydraulic system employed to supply and exhaust rams 90, 92, 94, and 96 which operate discharge valves 60 and 74 of the trailer compartments as described above. Flow of hydraulic fluid from the outlet of pump 302 to rams 90, 92, 94 and 96 is controlled by four valves generally designated 350, there being one valve 350 for each ram. Control valves 350 as shown are each of the conventional four-way reversing rotary type valve including: an inlet port 352 supplied from a manifold 353 connected to the outlet of pump 302; a return port 354 connected to reservoir 300; and a pair of work ports 356 and 358 connected to the opposite ends of one of the rams 90, 92, 94, 96. Flow between inlet port 352, work ports 356, 358 and return port 354 is controlled by a typical rotary valve member 360 which has three positions obtained by means of an actuating lever 362 fixed to valve member 360.

In one position of control valve member 360, inlet and return ports 352, 354 are blocked from communication with work ports 356 and 358 and thus the rams 90, 92, 94, 96 and associated valves 60 and 74 are locked in position. In the second position, hydraulic fluid flows from inlet port 352 to one end of the associated ram through valve member passage 366 and one of the work ports; while fluid exhausts from the other end of the ram to return port 354 through the other work port and another valve member passage 368. In this second position of control valve member 360, the associated ram and associated discharge valves 60, 74 are driven in one direction. In the third position of control valve member 360, the flow of hydraulic fluid is reversed to thereby drive the associated rams and valves in the opposite direction.

Figure 36:
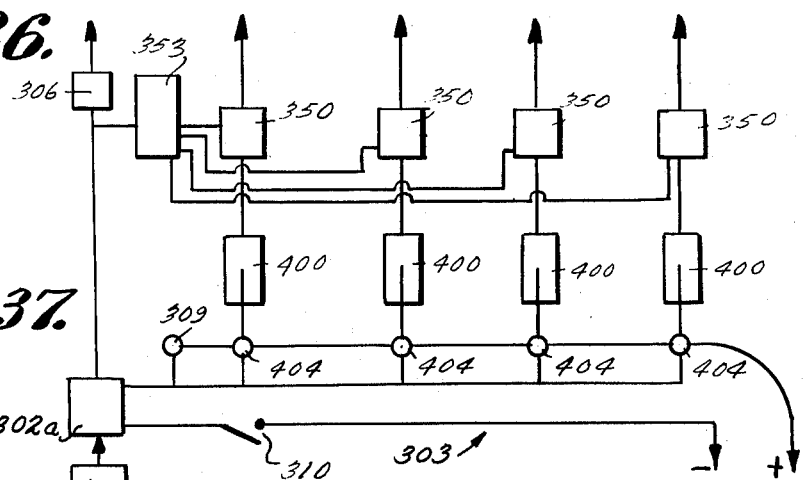
FIG. 36 is a schematic view of an electromagnetic device employed to actuate the valve of FIG. 27.

Referring to FIG. 36 control valves 350 may be power-actuated into their three positions by any suitable means such as four electromagnetic devices, generally designated 400, each operatively connected to the lever 362 of an associated valve 350. Energization and de-energization of electromagnetic devices 400 is provided by switches 404 (see FIG. 37) which may be conveniently operated by push buttons housed in a control panel (not shown).

Circuitry

Figure 37:
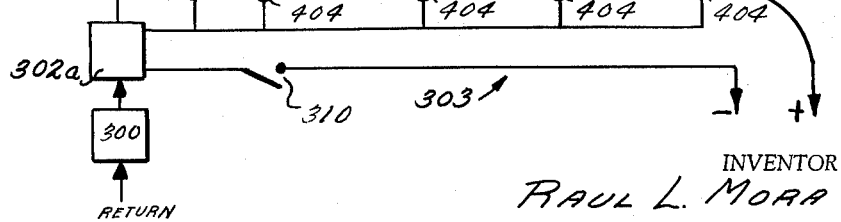
FIG. 37 is a diagrammatic view illustrating a control circuit including the device of FIG. 36 and portions of the systems of FIGS. 22 and 26.

Referring to FIG. 37 electric motor 302a which drives pump 302 is connected in a circuit 303 controlled by the on-off switch 310 located at the latch of abutment posts 160 so as to be actuated by lever 173 to close circuit 303 when lever 173 is moved to release latch 171 and open the circuit when lever 173 is moved to engage latch 171. Additionally motor 302a is controlled by a pair of switches 309 suitably provided in master valve 306 as illustrated in FIG. 25 so as to be closed by means of an electrical contact arm 311 fixed on the actuating lever 320 of master valve 306 when lever 320 is placed in either of the second or third positions for raising or lowering the trailer. In the neutral or locking position of master valve lever 320, switches 309 are opened and pump motor 302a is de-energized.

In order to provide energization of pump motor 302a for supplying hydraulic fluid for operating the rams of discharge valves 60 and 74, after the switches 309 have been opened upon placement of the master valve into locking position, the switches 404 which control electromagnetic actuators 400 of valves 350 are each connected with motor 302a so as to close a circuit through the pump motor 302a while simultaneously energizing the associated electromagnetic device 400 for either opening or closing the discharge valves 60 and 74.

Operation

Operation of the trailer will be apparent from the above description taken in conjunction with the following explanation: Assuming that the trailer has been delivered to a job site and it is desired to unload the concrete ingredients from the trailer, the operator first unlatches abutment posts 160 from the bottom of the trailer by means of lever 173 which also actuates switch 310 to close the pump motor circuit 303. Master valve 306 is then operated into the position for extending support legs 120 and 150 by means of the lever 320 which at the same time closes one of the switches 309 to energize the pump motor to thereby start the pump 302. Inner casings 124 of rear support legs 120 will then descend to engage the ground below the trailer and to lift the rear end of the trailer while tilting leg 150 extends to raise the front end of the trailer above the rear end. As the trailer is being so raised the rear legs 120 will pivot (counter-clockwise as viewed in FIG. 15) relative to the trailer body and when the trailer reaches the fully raised position (shown in phantom FIG. 15), the rear legs 120 will extend at a slight angle to the vertical. During the raising of the trailer while the rear legs 120 are pivoting, the cables 220, 221 connecting rear legs 120 to abutment posts 160, will rotate about a transverse axis through abutment posts 160, but will be maintained in the same spaced interrelationship as when the trailer is in the horizontal position.

Additionally, if the trailer should be positioned on a surface which slopes transversely relative to the trailer, the leveling device 180 in the manner described above will compensate for this to nevertheless maintain the trailer level from side to side while the trailer is being raised.

The trailer having been raised into an inclined position sufficient to overcome the angle of repose of the dry aggregates in the trailer compartments, the master valve is then operated to de-energize pump motor 302a and stop the supply and exhaust of rams 132, 151 of legs 120, 150 thereby locking the latter in extended position. Control valves 350 are then operated, by closing switches 404, to re-energize pump motor 302a and to open discharge valves 60 and 74 whereby the dry aggregates will flow from their respective compartments along ducts 52, 53, 54, 55 and discharge from outlet 70 while the liquid will be discharged from outlet spout 76. One or all of the control valves 350 may be actuated depending on the number of batches to be mixed thus if only one batch is desired, only one switch 404 and associated control valve 350 are actuated. The supply of compressed air to manifold 83 may be commenced by any suitable means upon opening of the liquid discharge valves 74. During unloading, discharge valves 60 and 74 are locked in open position by placing valves 350 into the position which stops hydraulic flow to and from the rams of the discharge valves.

When unloading has concluded, the operator actuates the control valves 350 to their third position to reverse the flow of hydraulic fluid to the rams 90, 92, 94, 96 whereby flap valves 60 and the liquid valves 74 will return to closed position. Thereafter, master control valve 306 is actuated to reverse fluid flow through the rams of the support legs 120, 150 to thereby retract the legs 120, 150 and return the trailer into its normal horizontal position with the top of abutment posts 160 engaged in their sockets 161 at the bottom of the trailer. Master valve 306 is then operated by its lever 320 into the normal position wherein all of the master valve ports are closed and the support legs 120, 150 are locked in retracted position. Lever 173 is then operated to latch abutment posts 160 to the trailer and at the same time to open the circuit 303 of pump motor 302a.

Front bearing shoe 162 is then raised from the ground by retracting U shape frame 163 into the abutment posts 160 by manipulating crank 168. Retraction of U shape frame 163, however, should be effected after the trailer is hitched to the tractor so as to insure that the trailer will not be lowered below the level necessary for convenient hitching to the trailer. The trailer is then ready to be returned to the batching plant or to remain at the construction site to be subsequently unloaded to provide another batch.

As will be apparent to persons skilled in the art, various modifications and adaptations, of the structure above described will become readily apparent without departure from the spirit and scope of the invention which is defined in the appended claims.

What is claimed is:

1. A trailer for storing, transporting and dispensing ingredients for making a batch of concrete and the like comprising a body having a plurality of compartments arranged longitudinally of the body dimensioned to receive various ingredients, duct means generally at the base of said body communicable with said compartments for conveying the ingredients to one end of said body, outlet means at said one end of the body for dispensing the ingredients conveyed in said ducts, and means for raising the other end of said body above said one end for causing the ingredients received in said compartments to flow by gravity through said duct means to said outlet means for discharge.

2. The trailer as defined in claim 1 wherein each compartment has an outlet port communicable with said duct means and a valve means is provided for opening and closing each of the outlet ports.

3. The trailer as defined in claim 2 wherein the compartments are formed in part by inclined partitions extending from the top of the trailer downwardly toward said one end of the trailer.

4. In combination with a trailer having a number of compartments for storing ingredients of a batch of concrete or the like; and an outlet means generally at one end thereof for discharging the ingredients, a mechanism for lifting and pivoting the trailer to discharge the ingredients from the trailer by gravity comprising a pair of support legs pivotally mounted on opposite sides of the trailer at said one end thereof for movement in a plane generally parallel to the sides of the trailer, each leg having an extendible portion adapted to engage the ground below the trailer to lift said one end of the trailer above a normal position thereof, and support means located generally at the other end of the trailer including a third leg having one end fixed to said trailer and extendible along an incline path for raising said other end of the trailer above said one end of the trailer to thereby provide gravity discharge of the ingredients from said trailer.

5. The combination as defined in claim 4 wherein said support means includes an abutment having a base adapted to rest on the ground below the trailer and having a top end engagable with the bottom of the trailer when the trailer is in normal position and wherein said third leg is connected to said abutment at the other end of said third leg.

6. The combination as defined in claim 5 wherein there is provided a latch means releasably connecting said top end of the abutment to the bottom of the trailer.

7. The combination as defined in claim 5 wherein there are provided a pair of cables connecting the opposite end of said pair of support legs with said abutment.

8. The combination as defined in claim 4 wherein each of said pair of legs includes an elongate outer shell pivotally connected intermediate the ends thereof to the trailer body, an elongate inner shell slideably received in said outer shell, a reciprocable ram mounted in said inner shell, a shoe engagable with the surface below said trailer, and means connecting one end of said ram to said inner shell and said shoe whereby reciprocation of said ram will cause said inner shell together with said shoe to move longitudinally.

9. The combination as defined in claim 8 wherein said means connecting said ram to said shoe provides pivotal movement of said shoe relative to said inner shell and said ram.

10. In combination with a trailer having a first support leg generally at one end of the trailer and second and third support legs at the opposite sides of the trailer at the other end thereof, said legs each having extendible and retaractable portions for raising the trailer to a tilted position wherein said one end is located above said other end of the trailer and for lowering the trailer to a horizontal position; hydraulic means for driving said leg portions between extended and retracted positions including a level control device for supplying different amounts of hydraulic fluids to drive said portions of said second and third legs when the trailer is out of level from one side to the other side thereof whereby the second and third legs will move at different rates of speed to bring the trailer into level from one side to the other side thereof.

11. The combination as defined in claim 10 wherein said level control device includes a casing pivotally suspended from said trailer for movement about a horizontal axis extending transversely of the trailer, said casing having a hydraulic fluid chamber, an inlet communicating with said chamber and a source of hydraulic fluid, a pair of outlets for conveying hydraulic fluid from said chamber to drive said second and third leg portions respectively, and a valve member mounted in the casing for rotational movement about an axis parallel to the longitudinal axis of the trailer body, said valve member having passage means dimensioned to communicate said chamber with said outlets depending on the angular position of said valve member, and weight means connected to said valve member for urging said valve member into a position wherein said passage means provides equal registration between said chamber and said outlets when the trailer is level from one side to the other side thereof, and increased registration between one of the outlet ports and said chamber and decreased registration between the other outlet port and said chamber when the trailer is out of level from one side to the other side thereof.

12. A trailer for storing, transporting and dispensing ingredients for making a batch of concrete or the like comprising in combination a body having a plurality of compartments for storing various batch ingredients, an outlet generally at one end of the body for discharging the ingredients, duct means communicable with said compartments for conveying the ingredient from the compartments to said outlet, a plurality of valves associated with said compartments respectively for controlling flow of the ingredients from the compartments into said dust means, hydraulic rams associated with a number of said valves to operate the same respectively, a hydraulic reservoir in the body, means for supplying hydraulic fluid from said reservoir to said hydraulic rams including a plurality of control valves associated with the rams respectively, hydraulic leg means for raising the other end of said trailer body above said one end to discharge the ingredients by gravity and a master control valve connected to said reservoir and controlling the supply of hydraulic fluid to said leg means to thereby control the operation of said leg means.

13. The combination as defined in claim 12, wherein there is provided an electric pump for delivering hydraulic fluid from the reservoir to said control valves, and said master control valve has a switch means for controlling energization and de-energization of said pump.

14. A level control device for use on a trailer adapted to be raised into a discharge position with one end of the trailer located above the other end thereof; said level control device comprising a casing adapted to be vertically suspended from a trailer for pivotal movement about a horizontal axis extending transversely of the trailer, said casing having a hydraulic fluid chamber, an inlet communicating with said chamber, and a pair of outlets, a rotary valve member mounted in the casing for movement about an axis extending perpendicular to said first axis and having passage means dimensioned to variably communicate said chamber with said outlets depending on the angular position of said valve member relative to the casing, and a weight means suspended from said valve member for urging said valve member into a first position wherein said passage means provides equal registration between said chamber and said outlets when the trailer is level from one side to the other side thereof and increased registration between one of the outlet ports and said chamber and decreased registration between the other outlet port and said chamber when the trailer is out of level from one side to the other side thereof.

15. A trailer for storing, transporting and discharging ingredients for making a batch of concrete and the like comprising a body having a plurality of compartments dimensioned to receive various ingredients, duct means generally at the base of said body communicable with said compartments for conveying the ingredients to one end of the body, outlet means at said one end of the body for discharging the ingredients conveyed in said duct means, means for raising the other end of said body above said one end into a discharge position causing the ingredients received in said compartments to flow by gravity through said duct means to said outlet means, and means for maintaining the body of the trailer level from one side to the other side thereof while said body is being raised into discharge position.

16. A trailer as defined in claim 15 wherein said means for raising the body into discharge position includes a first extendible and retractable support leg positioned generally at said other end of the body and second and third support legs positioned at said one end of the body on opposite sides thereof.

17. In combination with a trailer having a number of compartments for storing concrete-making ingredients and the like and an outlet means generally at one end thereof for discharging the ingredients; a mechanism for lifting and pivoting the trailer to discharge the ingredients from the trailer by gravity comprising a pair of support legs, means mounting said support legs to opposite sides of the trailer at said one end thereof for pivotal movement in a plane generally parallel to the sides of the trailer, and a support means located generally at the other end of the trailer including a third leg having one end pivotally secured to said trailer and being extendible for raising said other end of the trailer above said one end of the trailer for unloading the ingredients through said outlet means and being retractable for returning the trailer into a normal horizontal position.

18. In a trailer having a number of compartments for storing ingredients for making a batch of concrete and the like and having an outlet means generally at one end thereof for unloading the ingredients; a mechanism for lifting and pivoting the trailer into an unloading position comprising a pair of support legs mounted to opposite sides of the trailer at said one end thereof for pivotal movement in a plane generally parallel to the sides of the trailer, each leg having a hydraulically driven extendible portion engageable with the ground below the trailer for lifting said one end of the trailer above a normal horizontal position thereof, and a support structure located generally at the other end of the trailer including an abutment means having a base engageable on the ground below the trailer and having a top end engageable with the bottom of the trailer when the trailer is in said normal position and a leg fixed at one end to said abutment and having a hydraulically driven extendible portion secured to said trailer for raising said other end of the trailer above said one end.

19. The trailer defined in claim 18 further including a latch means releasably connecting the top end of said abutment means to the bottom of the trailer, a lever for operating said latch means to engage or release said abutment means with respect to the trailer, a hydraulic reservoir in the trailer for supplying hydraulic fluid to extend and retract said legs, an electric pump in said trailer for pumping hydraulic fluid from said reservoir to said legs, and an on-off switch controlling energization of said pump positioned to be closed by said lever when the lever is moved to release said latch means.

20. A trailer for storing, transporting and discharging ingredients for making a batch of concrete or the like comprising in combination a body having a plurality of compartments for storing various batch ingredients, an outlet generally at one end of the body for discharging the ingredients, duct means communicable with said compartments for conveying the ingredients from the compartments to said outlet, a plurality of valves associated with said compartments respectively for controlling flow of the ingredients from the compartments into said duct means, hydraulic rams associated with a number of said valves to operate the same respectively, a pair of hydraulic support legs pivotally mounted to opposite sides of the body at one end of the body, said support legs being extendible and retractable to raise and lower said one end of the trailer body, a third hydraulic support leg fixed to the trailer body generally at the other end thereof and being extendible and retractable for raising said other end of the trailer body above said one end and for returning said trailer body to a normal horizontal position, a hydraulic reservoir in the body, means for supplying hydraulic fluid from said reservoir to said rams including a plurality of control valves associated with the rams respectively, and a master control valve connected to said reservoir and controlling the supply of hydraulic fluid to said support legs to thereby control the operation of said support legs.

21. A trailer for storing, transporting and dispensing concrete ingredients or the like comprising an insulated and air-tight body including a top wall, opposite end and side walls, and a base, a plurality of longitudinally spaced air-tight and insulated compartments formed in the body by a plurality of longitudinally spaced inclined partitions extending from the top wall downwardly towards one end of the body, said compartments dimensioned to receive bulk quantities of different ingredients, an outlet means at said one end of the body for dispensing the ingredients from the body, duct means longitudinally extending along the base for conveying the ingredients from the compartments to said outlet means, means for selectively communicating the compartments with said duct means, a plurality of inlet openings in the top wall of the body for supplying the compartments with ingredients, each inlet opening having a removable cover constructed and dimensioned to close the associated opening in an air-tight manner, and means for raising the other end of the body above said one end for causing the ingredients received in the compartments to flow by gravity through said duct means to said outlet means for discharge.

22. A trailer for storing, transporting and dispensing concrete ingredients or the like comprising a body having a top wall opposite end and side walls and a base, a plurality of longitudinally spaced inclined partitions in the body extending downwardly from the top wall towards one end wall and defining a plurality of longitudinally spaced major compartments dimensioned to receive bulk quantities of ingredients, two of said compartments each having a plurality of transversely spaced partitions defining in each of said two compartments a plurality of sub-compartments, a plurality of longitudinal ducts extending along the base below the compartments, an outlet means at said one end wall in communication with said ducts, a number of compartments and sub-compartments each having an outlet passage adjacent the base extending into a number of said ducts, a valve means positioned in each of said outlet passages for controlling flow of ingredients from said number of compartments and sub-compartments into said ducts, and means for raising the other end of the trailer body above said one end for causing the ingredients received in the compartments to flow by gravity through said ducts to said outlet means for discharge.

23. The trailer as defined in claim 22 wherein one of said two sub-divided major compartments is located at said one end of the trailer and is adapted to receive liquid ingredients in its sub-compartments, and wherein there is provided a second outlet means at said one end for discharging the liquid ingredient.

24. The trailer as defined in claim 22 wherein one of said two major compartments is located at said one end of the trailer and is adapted to receive liquid ingredients in its sub-compartments, and wherein there is further provided an outlet manifold at said one end of the trailer and passages extending between said outlet manifold and said liquid sub-compartments, a plurality of valves in each of said passages, valve means controlling flow from said liquid sub-compartments to said manifold, and a second outlet means at said one end of the trailer in communication with said manifold for discharging liquid ingredient from the trailer.

25. The trailer as defined in claim 24 wherein the trailer is provided with means for introducing compressed air into said liquid sub-compartments for accelerating the discharge of liquid therefrom.

26. The trailer as defined in claim 24 wherein said valve means which control the flow of ingredients into said ducts include pivotable valves and said valve means controlling flow of liquid ingredient include reciprocating valve members.

27. A trailer for storing, transporting and dispensing concrete ingredients and the like comprising in combination a body having therein a first compartment for receiving coarse aggregate, a second compartment for receiving fine aggregate, and a third compartment for receiving liquid, an outlet means at the rear end of the trailer generally at the base thereof for dispensing the ingredients from the respective compartments, passage means at the base of the trailer extending between said compartments and outlet means for conveying the ingredients to said outlet means for discharge, valve means in each passage controlling flow of the ingredients to said outlet means, and means for raising the front end of said body above said rear end for causing the ingredients received in said compartments to flow by gravity through said passage means to said outlet means for discharge when said valve means are in open position.

28. The trailer as defined in claim 27 wherein there is provided an actuating means for simultaneously operating each of said valve means into open and closed positions.

29. The trailer as defined in claim 28 wherein said actuating means includes a hydraulic ram and linkage means connecting said ram to each of said valve means.

30. A trailer for storing, transporting and dispensing concrete ingredients or the like comprising in combination a body having a plurality of compartments for receiving various concrete ingredients and the like, an outlet at the rear end of the trailer body for discharging the ingredients from the trailer body, passage means extending between said compartments and said outlet for conveying the ingredients from said compartments to said outlet, a plurality of discharge valves in said passage means for controlling the flow of the ingredients from said compartments respectively to said outlet, actuating means for said valves including a hydraulic ram, a reversing valve controlling flow of hydraulic fluid to said ram and having three control positions for opening, closing and locking each of said valves and unloading means for raising the front end of the trailer body above the rear end for causing the ingredients to flow by gravity from said compartments along said passage means and through said outlet when said valves are in open position.

31. The trailer as defined in claim 29 wherein there is provided an electromagnetic device for actuating said reversing valve, an electric pump for supplying hydraulic fluid to said reversing valve and ram, and switch means for energizing said electromagnetic device to actuate the reversing valve for actuating said discharge valves while simultaneously energizing said pump.

32. The trailer as defined in claim 31 wherein said unloading means includes a plurality of hydraulic unloading rams supplied by said pump and wherein there is provided a master control valve for controlling the flow of hydraulic fluid to and from said unloading rams, said master valve having three positions for extending, retracting and locking said unloading rams, and switch means operable by said master valve to energize said pump when the master valve is positioned to extend or retract said unloading rams and for de-energizing said pump when the master valve is positioned to lock said unloading rams.

33. A trailer for storing, transporting and discharging concrete ingredients and the like comprising in combination a body having opposite top and bottom walls and opposite side and end walls enclosing a space, partition means in the body defining with said walls at least two separate compartments for coarse aggregate, two separate compartments for fine aggregate, and two separate compartments for liquid, said partition means providing insulated and air-tight sealing of each of said compartments, outlet means, passage means generally at the bottom wall of the trailer extending between said compartments for conveying aggregate from the aggregate compartments to said outlet means for discharge, valve means in said passage means having an open position permitting flow of aggregate from the aggregate compartments to said passage means and a closed position sealing the aggregate compartments with respect to said passage means, and means for raising the front end of the body above the rear end thereof for causing aggregate in the aggregate compartments to flow by gravity through said passage means to said outlet means for discharge when said valve means are in open position.

34. A trailer for storing, transporting and dispensing ingredients for making a batch of concrete and the like comprising a body, a plurality of compartments in the body dimensioned to receive various ingredients, duct means generally at the base of said body communicable with said compartments for conveying the ingredients to one end of said body, outlet means at said one end of the body for dispensing the ingredients conveyed in said duct means, and means for raising the other end of said body above said one end for causing the ingredients received in said compartments to flow by gravity through said duct means to said outlet means for discharge.

References Cited by the Examiner

UNITED STATES PATENTS

| | | | |
|---|---|---|---|
| 2,357,853 | 9/1944 | Franco | 212—145 |
| 2,438,571 | 3/1948 | Maxon | 280—6 |
| 2,556,610 | 6/1951 | Biszantz | 280—1 |
| 3,021,016 | 2/1962 | Noll et al. | 212—145 |
| 3,079,009 | 2/1963 | Davis | 212—145 |
| 3,083,059 | 3/1963 | Biszantz | 298—17 |
| 3,094,359 | 6/1963 | Biszantz et al. | 298—8 |
| 3,111,346 | 11/1963 | Habers et al. | 298—8 |

FOREIGN PATENTS 2,939   1914   Great Britain.

LOUIS J. DEMBO, *Primary Examiner.*

CHARLES R. CARTER, *Examiner.*